Figure 1:
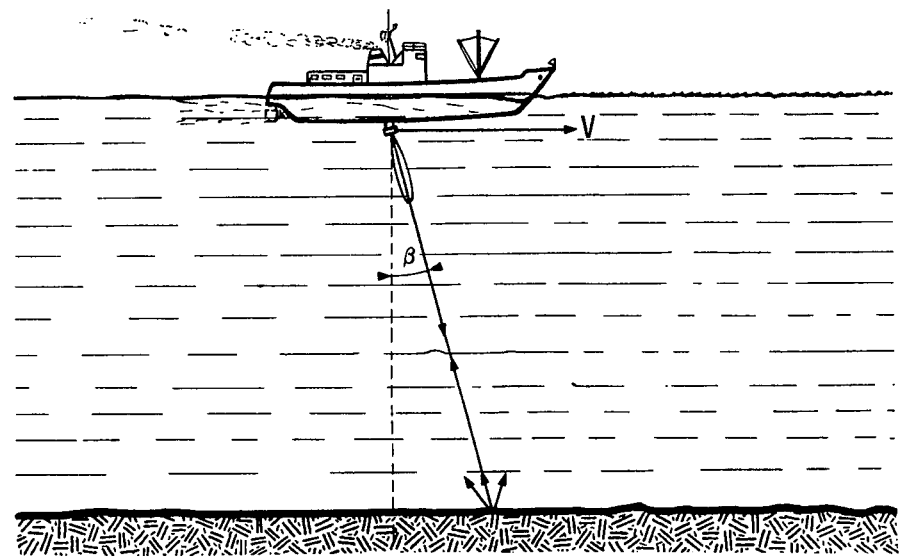

United States Patent [19]

Delignieres

[11] 4,065,744

[45] Dec. 27, 1977

[54] DOPPLER NAVIGATION METHOD FOR DETERMINING THE DISTANCE TRAVELLED BY A VEHICLE

[75] Inventor: Robert Delignieres, Colombes, France

[73] Assignee: Institut Francais du Petrole, France

[21] Appl. No.: 687,888

[22] Filed: May 19, 1976

Related U.S. Application Data

[63] Continuation-in-part of Ser. No. 480,373, June 18, 1974, abandoned.

[30] Foreign Application Priority Data

June 28, 1973 France .................................. 75.23595

[51] Int. Cl.² .............................................. G01S 9/66
[52] U.S. Cl. .................................................. 340/3 D
[58] Field of Search ........................................ 340/3 D

[56] References Cited

U.S. PATENT DOCUMENTS

| 3,617,995 | 11/1971 | Goulet | 340/3 D |
| 3,742,437 | 6/1973 | Thiele | 340/3 D |
| 3,745,520 | 7/1973 | Barret et al. | 340/3 D |
| 3,863,198 | 1/1975 | Lerner | 340/3 D |

*Primary Examiner*—Richard A. Farley
*Attorney, Agent, or Firm*—Craig & Antonelli

[57] ABSTRACT

Method and apparatus for determining the distance travelled by a vehicle with respect to a reference surface from the frequency shift between the frequency of signals transmitted from the vehicle and the frequency of echo-signals reflected on said surface in which the transmitted signals consist of a series of pulses of variable recurrence period whose duration is shorter than the propagation time interval of said signals from the transmission point to the reception point of the echo-signal and in which the frequency of the signals constituting said pulses is variable during the period of each pulse.

16 Claims, 11 Drawing Figures

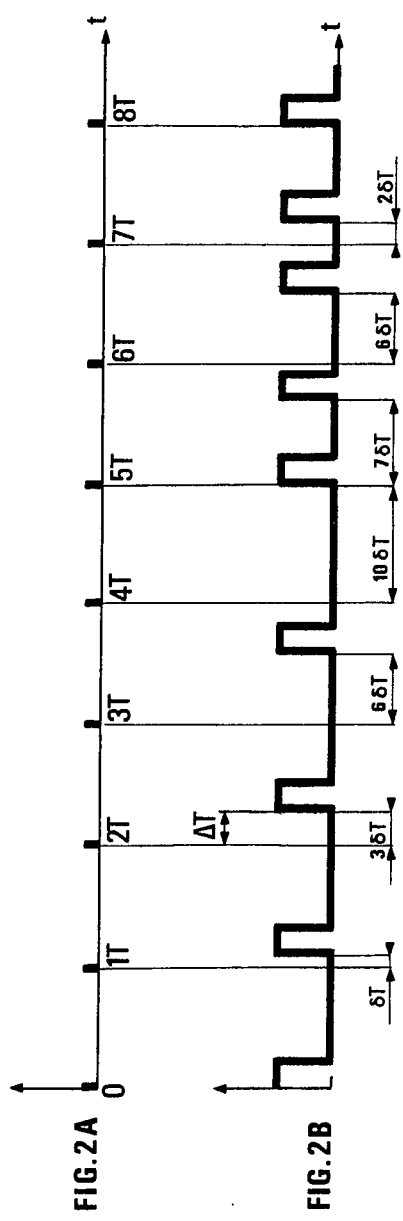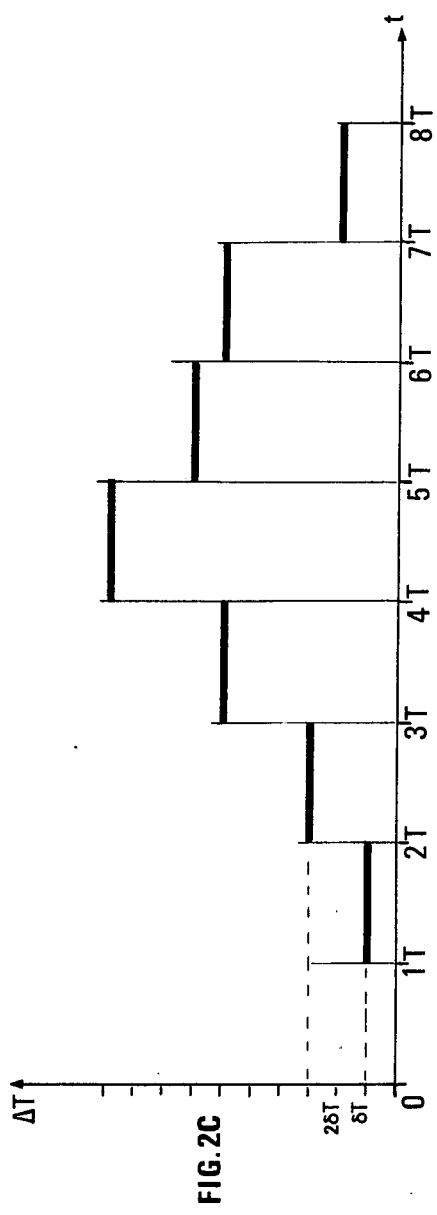

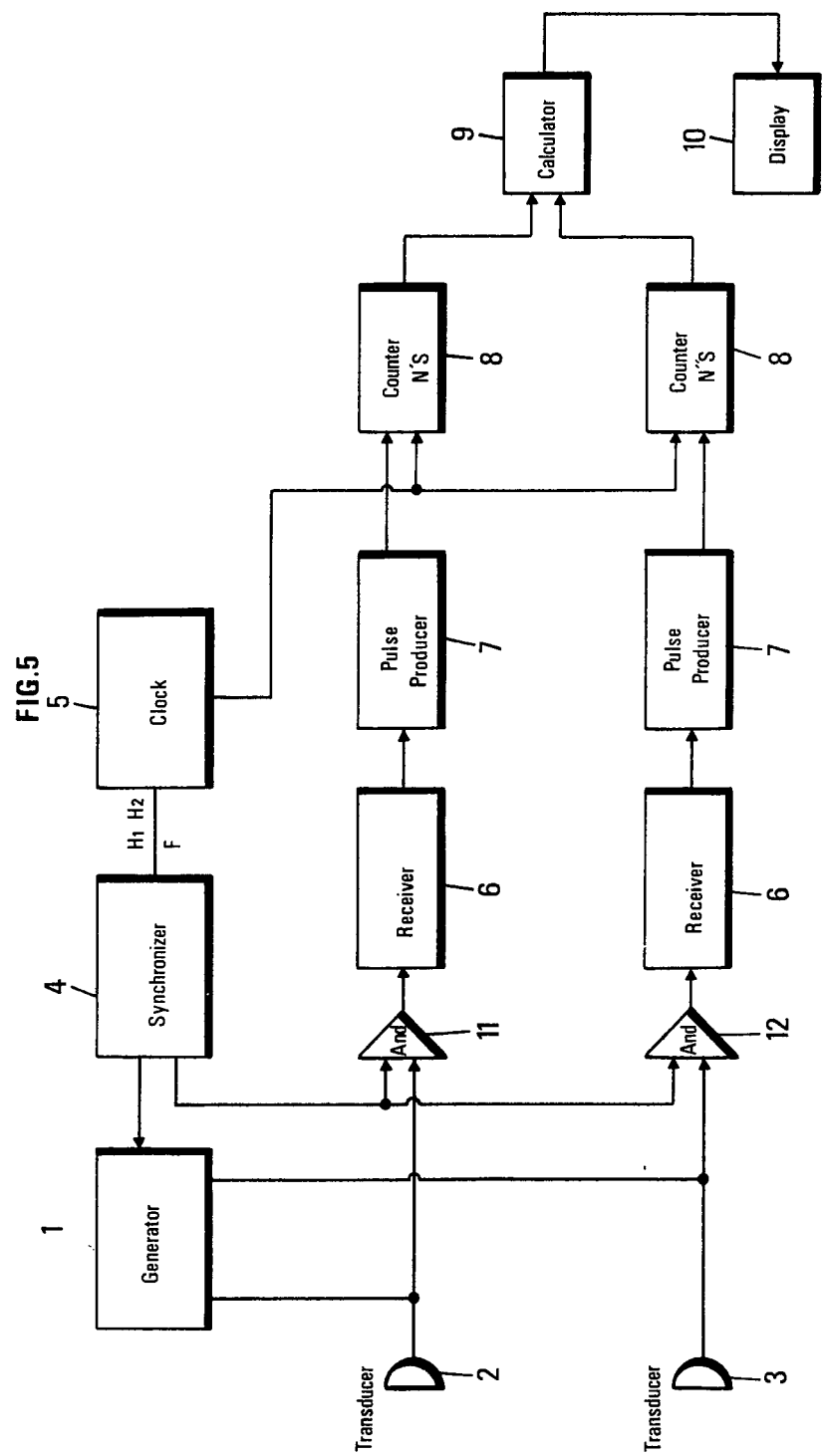

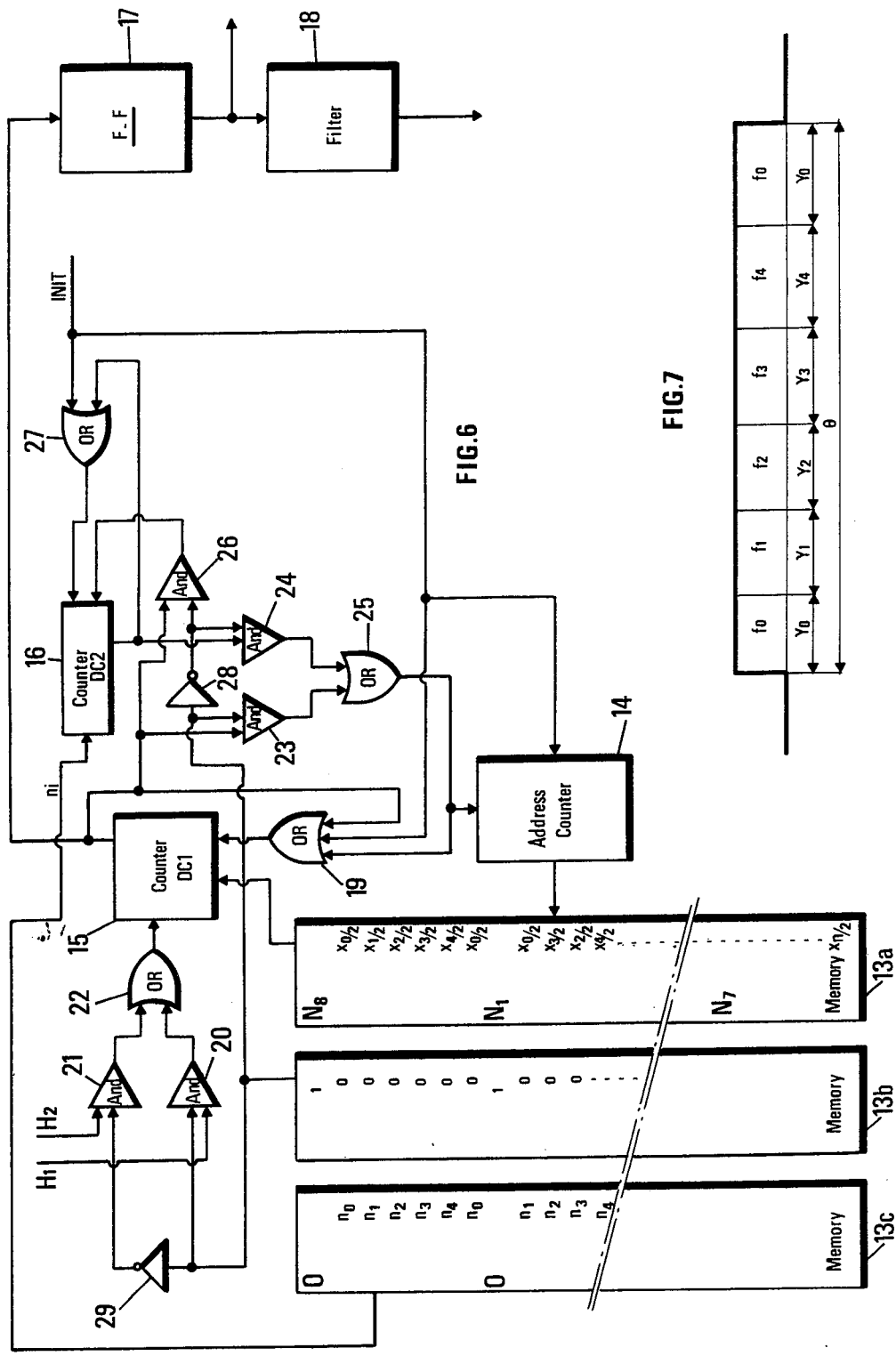

DOPPLER NAVIGATION METHOD FOR DETERMINING THE DISTANCE TRAVELLED BY A VEHICLE

CROSS-REFERENCES TO RELATED APPLICATIONS

This application is a continuation-in-part of application Ser. No. 480,373 filed June 18, 1974, now abandoned This invention concerns a method of navigation making use of the Doppler effect for determining the distance travelled by a vehicle with respect to a reference surface and apparatus for carrying out the method.

It can be used, in particular, for determining the distance travelled by a ship moving on a deep water body.

The method makes use of the information relating to the velocity of the ship as indicated by the Doppler frequency shift concerning the frequency of echoes corresponding to sonic waves transmitted from the ship and reflected on the bottom of the water body.

Among the known methods in the field of Doppler navigation systems, are those comprising the continuous transmission of sonic waves and the reception of the corresponding echoes on receiving-transducers separate from the transmitting-transducers. The major drawback of the continuous transmission results from the acoustic coupling between the transmitters and the receivers. As a result of a mechanical coupling of transmission leaks and parasitic motions if any (rolling, pitch), the receivers permanently receive a variable portion of the signals at the transmission frequency. It results therefrom a windening of the Doppler frequency spectrum and a variable error in the detection of the main frequency thereof, which is detrimental to the reliability of the measured values.

Another method consists in transmitting signals of a duration at most equal to the time interval between the beginning of the transmission and the reception of the echo and then of measuring the frequency shift during the transmission interruption. The transmission time, determined for example, by means of an echo-sounder, may vary continuously or by steps, when the distance from the vehicle to the reference surface increases or decreases. The reception time and, consequently, the recurrence period of the transmitted signals depend on the distance from the vehicle to the reverberating surface.

The use of this method has the double advantage which is particular to a transmission by pulses, to make possible the use of a single transducer for each transmission direction and to remove the effects of acoustic coupling observed in the case of a continuous transmission.

However, when the depth of the water body increases, the propagation time of the acoustic waves from their transmission instant to their reception instant may be significant (two seconds or more).

The decrease of the sampling frequency, i.e., of the recurrence frequency of the measuring operations, results accordingly in a less precise measurement of the velocity vector.

It is an object of this invention to provide a Doppler navigation method for determining the distance travelled by a vehicle with respect to a reference surface, which may be very far therefrom, whereby the above-mentioned drawbacks may be avoided.

This method comprises transmitting signals consisting in a series of ultra-sonic pulses from the vehicle in at least one transmission direction inclined with respect to the surface; receiving the echo-signals corresponding to the transmitted signals and reflected by said surface and measuring the space travelled by the ship from the frequency shift between the frequency of the transmitted pulses and that of the pulses received along the transmission directions.

In accordance with the present invention, the frequency of the ultrasonic signals forming the pulses is variable during the period of the latter.

The frequency of the signals transmitted during each pulse being variable, the frequency sequence which can be detected in each received pulse, is characteristic of the latter. It permits identification of the pulse and optionally to control the reliability of the measurement and to establish a correlation between said pulse and the corresponding transmitted pulse.

The transmission may comprise an uninterrupted series of pulses of constant duration whose recurrence period is variable and shorter than the propagation time interval between the transmission of the signals and the reception of their echoes.

Since the recurrence period of the pulses is variable, any casual coincidence between the transmission of a pulse and the reception of another previously transmitted pulse, when the distance between the vehicle and the surface reaches certain determined values, could not happen again except for a very limited number of the other received pulses, by suitable selection of the time intervals between the successive pulses.

The measurement of the Doppler effect relating to the received signals may be carried out irrespective of the distance from the vehicle to the surface. Moreover, the recurrence period of the successive pulses is shorter than the propagation time of the pulses and may be selected small enough as compared to the latter so as to increase the sampling frequency and, accordingly, the quality and accuracy of the measurements.

Figure 3A:
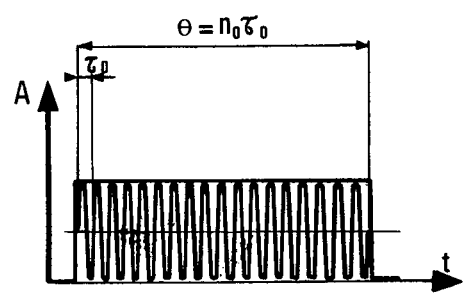
Figure 3B:
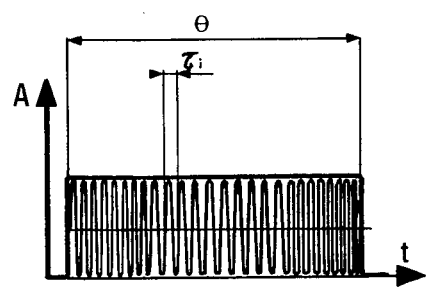
Figure 4A:
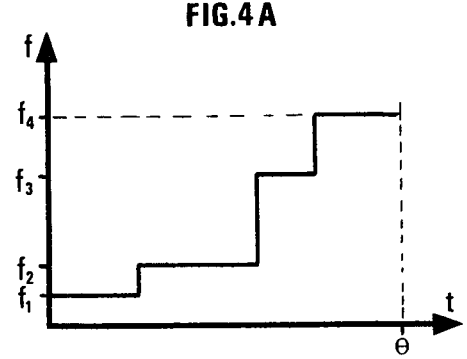
Figure 4B:
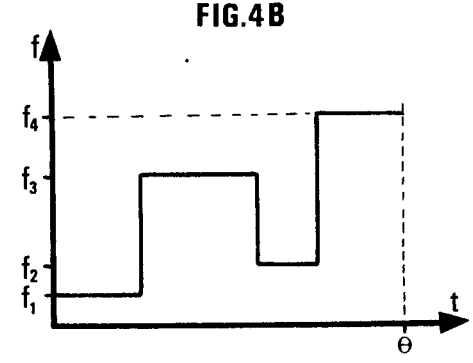

Other remarkable features and advantages of the invention will be made apparent from the following description of non-limitative examples of embodiments illustrated by the accompanying drawings wherein:

FIG. 1 shows the position of a transmission-reception beam of sonic waves with respect to submerged ground surface, FIGS. 2A, 2B and 2C show chronograms of pulses transmitted from the ship along the transmitting direction, FIGS. 3A and 3B show signals transmitted within the period of each pulse, FIGS. 4A and 4B illustrate different pulse modulation codes, FIG. 5 illustrates in block diagram form an embodiment of apparatus of the present invention, FIG. 6 illustrates a synchronizer for use in the FIG. 5 embodiment, and FIG. 7 illustrates a generated rectangular signal and the frequency-period relationship in accordance with the present invention.

The ship, shown in FIG. 1, comprises at least one, and preferably two, sonic wave transmitting-receiving transducers secured to the hull, for example.

The transducer axis is placed, for example, in the vertical plane containing the longitudinal axis of the vehicle and, along an inclined direction with respect to the surface of the submerged ground. Let $\beta$ be the angle formed by the directions of the transmission beams with respect to a vertical line, let $p$ be the projection of the velocity vector V of the vehicle on the axis of the transmission beams and let $\Delta F$ be the shift between the frequency $f_o$ of the transmitted sonic waves and the frequency $(f)$ of the sonic waves received after reflection on the submerged surface.

The projection is related to the frequency shift $\Delta F$ as follows:

$$p = \lambda/2 \, \Delta F \tag{1}$$

in which $\lambda$ is the wave length of the signals transmitted through the propagation medium.

Since the projection $p$ has the value V sin $\beta$, the velocity of the vehicle is related to $\Delta F$ by the relationship:

$$V = \beta/2 \sin \beta \, \Delta F \tag{2}$$

taking care of relationship (1).

If moreover, $\beta$ is chosen equal to 30°, the velocity is merely expressed by:

$$V = \lambda \, \Delta F \tag{3}$$

The chronogram illustrated in FIG. 2B shows that the transmission signal is in the form of an uninterrupted series of pulses of a width $\theta$ and of a spacing varying about an average value T (FIG. 2A).

In the illustrated example, the shift $\Delta$ T of each pulse with respect to T is expressed as a multiple of an elementary shift unit $\delta$ T whose selected value is T/10. The shifts, expressed in $\delta$ T units, of the successive pulses shown in the figure are respectively 1, 3, 6, 10, 7, 6 and 2 units (see FIG. 2C). These shifts are provided in order that if a complete and casual coincidence happens between a transmitted pulse and a received pulse on the same transducer, when the propagation time of the pulses between the vehicle and the reference surface is equal to the time interval between any two transmitted pulses, this coincidence could not happen again completely but a very limited number of times.

By way of example, if the recurrence cycle of the shift code is 8T, the number of observed coincidences may be limited to a maximum of 2. In any case, the measurements of the Doppler effect may thus be performed on the greatest majority of the echo-pulses.

In the illustrated example, the sequence of the shifts to which the pulses are subjected, will be repeated at intervals of 8T.

The illustrated example of position modulation is, of course, not limitative. More generally, any mode of pulse shift may be selected, provided that it limits the possible number of casual coincidences which can occur between the transmitted pulses and the received echo-pulses.

Another remarkable feature of the method concerns the nature of the signals transmitted during the period of each pulse. It consists of varying versus time, the frequency of the transmitted signals during each transmission time interval $\theta$. The transmitted signals may consist for example of a continuous sequence of signals at different frequencies, which is called in the art FSK modulation. The value of the frequencies of the sequence and their succession order vary from one pulse to another so that the pulses transmitted during a time interval equal to that which separates the instant of transmission time of sonic waves from the instant of reception of their echoes and corresponding to the maximum range of the navigation system, might be easily distinguished from one another at the reception.

When each pulse is the envelope of a signal of a constant period $\tau_o$ (FIG. 3A), the total duration of the transmission is equal to a whole number $n_o$ of periods of said signal. By way of non-limitative example and for sake of easier computation it will be convenient to choose a sequence of signals which will be called signals of constant integration, i.e., a continuous succession of signals of period $\tau$ variable versus time within an interval $\delta T$ of a predetermined duration contained in each transmission interval $\theta$ and which complies with the relationship:

$$\int_{\theta'} n(t) \, \tau(t) \, dt = n_o \tau_o = \theta' \tag{4}$$

for each transmitted pulse. The interval $\theta'$ might be optionally chosen equal to $\theta$. Irrespective of the chosen code (value of the constituting frequencies and of their succession order), the number of periods contained in each pulse is a whole number.

It would be advantageous to choose a code consisting of a series of frequencies $f_1, f_2, \ldots f_i, \ldots f_k$ identical for each pulse.

For making each pulse recognizable the succession order of the frequencies inside each pulse is varied as well as the number $n_1, n_2, \ldots n_i, \ldots n_k$ of periods of the signals at periods $\tau_1, \tau_2, \ldots \tau_i, \ldots \tau_k$ corresponding respectively to the frequencies $f_1, f_2, \ldots f_i, \ldots f_k$ so as to obtain:

$$\Sigma_i n_i \tau_i = n_o \tau_o = \theta' \tag{5}$$

$\theta'$ is the transmission time which may be equal to $\theta$ but will be preferably chosen shorter than $\theta$ in order that the sequence of signals at frequencies $f_i$ constituting the pulse be not partially obscured by transistory phenomena which are observed by experience at the beginning of the reception of each pulse.

In this case, the transmission sequence of duration $\theta'$ will be immediately preceded and followed by a signal at a constant frequency optionally chosen different from the frequencies $f_i$, so that the duration of all the transmitted signals is $\theta$.

In order to determine the distance travelled by the vehicle, I measure the duration of a predetermined number of periods of the sequence of signals constituting each transmitted pulse and the duration of the same predetermined number of periods of signals constituting the corresponding received pulse when a correlation of the frequency codes contained in these pulses has been established.

The transmission time interval of $n_i$ periods of the signal at period $\tau_i$ inside the sequence is denoted by $\delta \theta_i$, the reception time interval of $n_i$ periods, each having the value $\tau'_i$, different from $\tau_i$ due to the Doppler effect, is denoted by $\delta \theta'_i$, the sum of the elementary intervals $\delta \theta'_i$ is denoted by $\theta''$; the reception frequency $f'_i$ corresponding to the transmission frequency $f_i$ is denoted by $$f'_i = 1/\tau'_i$$

and the shift between frequencies $f_i$ and $f'_i$ is denoted by $\Delta f_i$.

Accordingly, the preceding relationship (3) may also be written:

$$V = C \, \Delta f_i/f_i = C \, (f_i - f'_i/f_i) = C \, (1 - f'_i/f_i) \tag{6}$$

The distance travelled by the vehicle during the time interval $\theta'$ may be expressed as follows:

$$E_{\delta T} = V.\theta' = C \, \Sigma_i (1 - f'_i/f_i) \, \delta \theta'_i \tag{7}$$

In view of the interrelations between the different symbols, the relationship (5) is changed to:

$$E_{\theta'} = C \Sigma n_i \tau_i (n_i \tau'_i - n_i \tau_i / n_i \tau'_i) \quad (8)$$

The measurement of the duration of $n_i$ periods is achieved by measuring the number of periods of a clock-signal of a very short period $t_o$ as compared to that of the signals forming the transmission sequence. The measurement numbers $N_i$, $N'_i$ are respectively such that:

$$n_i \tau'_i = N'_i t_i \quad (9)$$

and $$n_i \tau_i = N_i t_o \quad (10)$$

In view of the preceding relationships, the equation (6) may be written:

$$E_{\delta T} = C t_o \Sigma_i N_i / N'_i (N'_i - N_i) \quad (11)$$

Moreover, on the assumption, which is justified by experience, that the value of $N'_i - N_i$ is small as compared to that of $N_i$, the preceding relationship may also be written:

$$E_{\delta T} = C t_o \Sigma_i N'_i - N_i \quad (12)$$

Denoting:

$$\Sigma_i N'_i = N'_s \quad (13)$$

$$\Sigma_i N_i = N_s \quad (14)$$

the relationship (12) can be written:

$$E_{\delta T} = C t_o (N'_s - N_s) \quad (15)$$

The distance travelled by the vehicle during the mean recurrence time interval of the successive pulses is expressed as follows:

$$E_T = K (N'_s - N_s) \quad (16)$$

K being proportional to $C t_o$ and to the ratio between T and $\theta'$. If the sequence of signals transmitted inside each pulse is of constant integration, the ratio between T and $\theta'$ and, consequently, the coefficient K are independent from the selected code and the number $N_s$, measuring the number of periods of the clock-signal included in the constant time interval $\theta'$, is itself a constant. The determination of the distance travelled can be performed by simple operations once recorded the number $N'_s$.

If the vehicle is provided with two transmission beams symmetrically oriented with respect to a vertical line and placed in a plane containing the symmetry axis of the vehicle, $N'''_i$ and $N'_i$ periods of the clock-signal will be respectively counted during each time interval of pulse reception on both beams, these two numbers having symmetrical values with respect to that of $N_i$.

In this case, the distance travelled during each interval T will be written:

$$E_T = K(N'_s - N''_s) \quad (17)$$

$N'_s$ and $N''_s$ denoting the total number of periods of the clock-signal counted during the reception time of the pulses respectively received on both beams.

The accuracy of each measurement will be better when the numbers $N'_s$ and $N''_s$ are greater, i.e., when the measurement period $\theta''$ is greater and the frequency of the clock-signal is higher.

All the measurements are time measurements which are carried out in a very simple manner.

As the method comprises an identification of the pulses, it is therefore possible to measure their propagation time and to make use of the results in known methods of "position correction" of the bottom dip and in filtrations of Doppler informations, particularly of the recurrent type.

The apparatus of the embodiment shown in FIG. 5 comprises a generator 1 producing the signal transmitted to two transducers 2 and 3, the transmitting axes of which are oriented symmetrically in correspondence with the vertical plane extending along the longitudinal axis of the vehicle, for example. The generator is controlled by a synchronizer 4 connected to a clock 5, i.e., an element producing pulses of frequencies $H_1$ and $H_2$ defining two different time scales. The signal transmitted to the generator is constituted by an uninterrupted sequence of transmission pulses of constant duration, the recurrence period of which is variable. Each of these pulses consists of a signal sequence, the frequencies of which are selected from a series of signals of different frequencies, produced in the synchronizer.

The transducers 2, 3 likewise receive the echoes of the transmission bursts. The signals thus received are directed through AND gates 11, 12 controlled by the synchronizer 4 to the receivers 6 where they are amplified and then transformed into pulses, the frequency of which is that of the received signals, in the pulse-producing devices 7. The total duration of the signals constituting each of the echoes of the transmission pulses is determined by evaluating the duration of the corresponding pulses transmitted by the devices 7. This duration is calculated by counting the number of cycles of a signal of a frequency F equal or proportional to that of the signals produced by the clock 5, contained in the time interval of the reception of each received echo along the two directions of transmission-reception. The counting operation is accomplished by two counters 8 connected with the clock 5 and with the device 7 according to relation (13). The two counters 8 are connected to a calculator 9 which determines the traversed distance according to relation (17). The result is then displayed in a visual device 10.

The synchronizer shown in FIG. 6, comprises essentially a memory or storage device 13, controlled by a selection device in the form of an address counter 14, two counters 15 and 16 operating as deducting elements, a bistable flip-flop 17, a pass band filter 18, and a system of logic elements enabling them to operate in synchronism.

The counter 15 (DC1) comprises a "loading" input connected to a memory block 13a, a "carry" output, a control input connected to its "carry" output by an OR gate 19, and a "clock" input connected respectively to two outputs producing pulses of frequencies H1 and H2 of the clock 5 through the intermediary of two AND gates 20, 21 and an OR gate 22. The control input of the AND gate 20 is connected to the corresponding input of the gate 21 by means of an inverter 29 and to the output of the memory block 13b.

The "carry" output of the counter DC1 is also connected to the "clock" input of the bistable flip-flop 17 having an output connected to the input of the filter 18. The "carry" output of the counter is also connected to the input of two AND gates 23, 26. The control input of the AND gates 23 is connected to the output of the memory block 13b and to the control inputs of the AND gate 26 and of an AND gate 24 by means of an inverter 28. The outputs of the gates 23 and 24 are connected by means of an OR gate 25 to an input of the OR gate 19, and to the "increment" input of the address counter 14. The "carry" output of the counter 16 (DC2) is connected to the control input of the counter 16 by means of an OR gate 27, and to the input of the AND gate 24. The output of the AND gate 26 is connected to the "decrement" input of the counter 16 (DC2) operating as a deducting element.

The "INIT" input of the synchronizer is connected to the input of the OR gates 19 and 27, and to the initialization "input" of the address counter 14. Lastly, the output of the memory block 13c is connected to the "loading" input of the counter 16 (DC2) and the filter 18 is connected to the transmission signal generator 1 (FIG. 5).

A logic zero at the INIT input of the synchronizer interrupts the transmission and causes initialization. That is, a number M corresponding to an initial address number is introduced into the address counter 14, resulting in the transfer of values $N_8$ and "zero" contained in the memory elements 13a and 13c respectively to the counters DC1 (15) and DC2 (16), and the transfer of a "1" logic to the inputs of the AND gates 20 and 23.

A "1" logic at the INIT input authorizes operation of the synchronizer and the transfer of clock pulses of period H1 to the counter DC1 (15) resulting in decrementing of the content of counter 15. When the counter 15 is empty, i.e., after a period of time $t_8 = N_8/H_1$ (FIG. 2B), it transmits at its "carry" output a signal which releases the flip-flop 17, increases the address counter 14 by means of the gates 23 and 25, and authorizes by means of the gate 19, the feeding of the values $x_0/2$ and $n_0$ respectively into the counters 15 and 16.

A "zero" logic transmitted by the memory block 13b then blocks the AND gates 20 and 23 and opens the gates 21, 24 and 26. The clock signal of frequency $H_2$ decrements the counter 15. The "carry or carry over" pulse which it transmits when it is empty, i.e., after a period of time $x_0/2H_2$ then causes the bistable flip-flop 17 to trip once again, but as the AND gate 23 is blocked this signal cannot increase the counter 14, and the value $x_0$ is again fed into the counter 15. The "carry or carry over" pulse also decrements the counter 16 by means of the gate 26. The preceding cycle is repeated $n_0$ times, after which the counter 16 is empty and transmits a "carry or carry over" pulse, which increments the address counter 14 by means of the gates 24 and 25. At the end of this first sequence of cycles of duration $\gamma_0 = n_0 x_0/2H_2$, the bistable flip-flop 17, has produced a square or rectangular signal of frequency $f_0 = H_2 x_0$.

The address counter then controls the transfer of numbers $x_1/2$ and $n_1$ respectively to the counters 15 and 16, and the transmission of a "zero" logic to the output of the memory block 13b, and the preceding process is repeated. Cycle sequences successively of duration $\gamma_1 = n_1 x_1/2 H_2$, $\gamma_2 = n_2 x_2/2H_2$, $\gamma_3 = n_3 x_3/2 H_2$ and $\gamma_4 = n_4 x_4/2 H_2$ and of $\gamma_0$ are produced and the bistable flip-flop 17 accordingly generates rectangular or square signals of successive frequencies $f_1 = H_2/x_1$, $f_2 = H_2/x_2$, $f_3 = H_3/x_3$, $f_4 = H_2/x_4$, and then again $f_0$ (FIG. 7) during the periods $\gamma_0, \ldots \gamma_4, \gamma_0$, respectively. The total duration of the series of cycles constituted by the successive sequences of cycles is equal to $\theta$ duration of each pulse transmitted.

At the end of the series of cycles, the "carry or carry over" of the counter 16 increments the address counter by a unit and causes transfer of a number $N_1$ to the counter 15 and the transmission of a "1" logic at the output of the memory block 13B. The clock having the frequency $H_1$ then decrements the counter 15, which transmits a "carry or carry over pulse". The total period of time and $N_1/H_1$ involved in unloading the counter defines the time period $t_1$ between the two first pulses of each series of transmitted pulses.

The process of interlinking cycles alternately rhythmed by means of clocks having frequencies $H_1$ and $H_2$ and of following up alternately with periods $t_2, t_3, \ldots t_7$ and pulses of duration $\theta$ is continued until the end of the recurrence period of duration 8T (FIG. 2B). The signal transmitted by the memory block 13b constitutes the envelope of the transmitted signal. The square signal produced by the bistable flip-flop 17 is then filtered in the pass-band filter 18 and converted into a cyclical series of pulses consisting of sinusoidal signals of frequencies $f_0, f_1 \ldots f_4$.

The frequency $f_0, f_1 \ldots f_4$ transmitted during each series of cycles and the duration of each of the latter depend respectively on the successive values $x_0, x_1, \ldots x_4$ and the successive values of the numbers $n_0, n_1, \ldots n_4$. The interlinking order of the series of cycles depends on the order of reading the values $x_0, x_1 \ldots x_4$ into the memory. To render each pulse identifiable, it is sufficient to select as many different frequency sequences as there are pulses during each recurrence period.

In the embodiment according to the invention, coding is effected by using four different frequencies. The corresponding four series of cycles are preceded and followed by a series of cycles of frequency $f_0$, not used for measuring the distance travelled by the vehicle, during which transitory signals may be produced.

The frequency of the clock signal $H_1$ will be selected, for example, in the frequency range of between 1 kHz and some tens of kHz. The frequency of the clock signal $H_2$ will be selected, for example, in the frequency range of between 1 MHz and some tens of MHz.

In order that the frequency codes selected are capable of "constant integration" the numbers $n_1, n_2 \ldots n_4$ are selected in such a way that the sum of the time periods $\gamma_1, \gamma_2, \gamma_3, \gamma_4$ is equal to the constant time period $\theta'$ (see relationship 5).

As coding of the pulses successively transmitted depends on the values recorded in the memory, it will not constitute a departure from the scope of the invention to store other cyclical sequences of values in the memory blocks 13a, 13b and 13c.

I claim:

1. A device for determinining the distance travelled by a vehicle movable with respect to a reference surface, comprising means for transmitting signals along at least one transmission direction inclined with respect to the reference surface, means for receiving echo signals corresponding to the transmitted signals on said surface, and means for measuring the distance travelled by the vehicle with respect to said surface, said transmitting means including memory means for storing repetitive data sequences, selection means for selecting the address of the data stored in said memory means and for controlling the extraction thereof, clock means for producing clock pulses defining time scales, means for producing signals whose frequencies are proportional to those of the clock frequencies and which depend on the values of the repetitive data sequences, and control means for activating the selection means in response to signals corresponding to the preselected values of said sequences.

2. A device as claimed in claim 1, wherein said means for producing signals whose frequencies are proportional to those of the clock pulses includes a first counter means connected to the clock means, a second counter means, means for producing transmission signals using the preselected signals produced by said first counter means and said second counter means, and said memory means includes first and second storage means for storing the repetitive data sequences and for transferring respectively to the first and second counter means two repetitive data sequences under the control of said selection means, and a third storage means for producing a repetitive sequence of logic signals controlled by said selection means, and said control means includes switching means controlled by said third storage means for directing to the address selection means signals produced by the first or second counter means upon passing through zero.

3. A device as claimed in claim 2, wherein said means for producing the transmission signals includes a bistable flip-flop and a filter.

4. A device as claimed in claim 2, wherein said switching means includes gate means and an inverter connected to the first counter means and to the second counter means, and controlled by logic signals transmitted by said third storage means.

5. A device as claimed in claim 2, wherein said first counter means is connected to said clock means through gate means and a signal inverter controlled by logic signals transmitted by said third storage means and directing clock pulses having two different frequencies alternately to said first counter means.

6. A device as claimed in claim 1, wherein the means for measuring the distance travelled by the vehicle with respect to the surface comprises counting means for counting the number of periods of a signal generated by the clock means, contained respectively in an equal number of periods of the transmitted signals and of the received signals, and means for computing the distance as a value proportional to the difference between the numbers of measured periods.

7. A device for determining the distance travelled by a vehicle with respect to a reference surface, comprising means for transmitting signals along at least one transmission direction inclined with respect to said reference surface, said transmitting means including means for producing an uninterrupted series of pulses, whose recurrence period is variable and whose frequency is variably during the period of each pulse, means for receiving echo signals corresponding to the transmitted signals on said surface, and means responsive to said receiving means for measuring the distance travelled by the vehicle with respect to said surface, said producing means including clock means for generating clock pulses and a system for generating signals whose frequencies are proportional to those of the clock pulses, said system comprising a signal generating means arranged for alternate positioning in two different states, and control means for alternately positioning said signal generating means at successive moments separated by time intervals depending on the period of the clock pulses and on repetitive data sequences of predetermined values.

8. A device as claimed in claim 7, wherein the control means comprises a first counter means for alternately positioning the signal generating means at preselected moments depending on the period of the clock pulses and a second counter means, memory means comprising a first storage means and a second storage means for storing the repetitive data sequences, selection means, the first and second storage means being arranged for respectively transferring into the first and the second counter means two repetitive data sequences upon control of the selection means, a third storage means for generating a repetitive sequence of logic signals up control of the selection means, and switching means controlled by the third storage means for directing to the selection means, the signals generated by the first or second counter means upon passing through zero.

9. A device as claimed in claim 8, wherein said generating means includes a bistable flip-flop.

10. A device as claimed in claim 8, wherein the switching means includes gate means and an inverter connected with the first counter means and the second counter means and controlled by logic signals transmitted by said third storage means.

11. A device as claimed in claim 8, wherein said first counter means is connected to the clock means through gate means and a signal inverter controlled by logic signals transmitted by said third storage member and directing clock pulses having two different frequencies alternately to said first counter means.

12. A device as claimed in claim 7, wherein the means for measuring the distance travelled by the vehicle with respect to the surface comprises counting means for counting the number of periods of a signal generated by the clock means contained respectively in an equal number of periods of the transmitted signals and of the received signals, and means for computing the distance as a value proportional to the difference between the numbers of measured periods.

13. A method for determining the distance travelled by a vehicle movable with respect to a reference surface, comprising the steps of transmitting from the vehicle along at least one transmission direction inclined with respect to the surface, an uninterrupted series of pulses whose recurrence period is variable and shorter than the propagation time interval between the transmission and reception of the signals, the pulses being comprised of signals which are variable in frequency during the period of each pulse, receiving echo signals corresponding to the transmitted signals after reflection from the surface, and measuring the distance travelled by the vehicle from the frequency shift between the frequency of the transmitted signals and that of the signal received along the transmission direction, the step of transmitting said series of pulses including controlling a pulse generating means by signals whose periods depend on clock pulses defining time scales and on predetermined values stored in a storage means.

14. A method as claimed in claim 13, wherein the clock pulses define two time scales of different values.

15. A method for determining the distance travelled by a vehicle movable with respect to a reference surface, comprising the steps of transmitting from the vehicle along at least one transmission direction inclined with respect to the surface of an uninterrupted series of pulses whose recurrence period is variable and shorter than the propagation time interval between the transmission and reception of the signals, the pulses being comprised of signals which are variable in frequency during the period of each pulse, receiving echo signals corresponding to the transmitted signals after reflection from the surface, and measuring the distance travelled by the vehicle from the frequency shift between the frequency of the transmitted signals and that of the signal received along the transmission direction, the step of transmitting said series of pulses including controlling a pulse generating means by signals whose periods are proportional to predetermined values stored in storage means and to clock pulses defining two different time scales.

16. A method according to claim 13, wherein the step of transmitting includes maintaining the mean recurrence period of the pulses calculated over the time interval of a sequence consisting of a predetermined number of pulses of the uninterrupted pulse series at a constant value.

* * * * *